Feb. 25, 1969  C. J. COLOMBO  3,429,998
METHOD AND ARRANGEMENT FOR CHECKING OF LINES IN
TELEGRAPH INSTALLATIONS
Filed Aug. 16, 1965
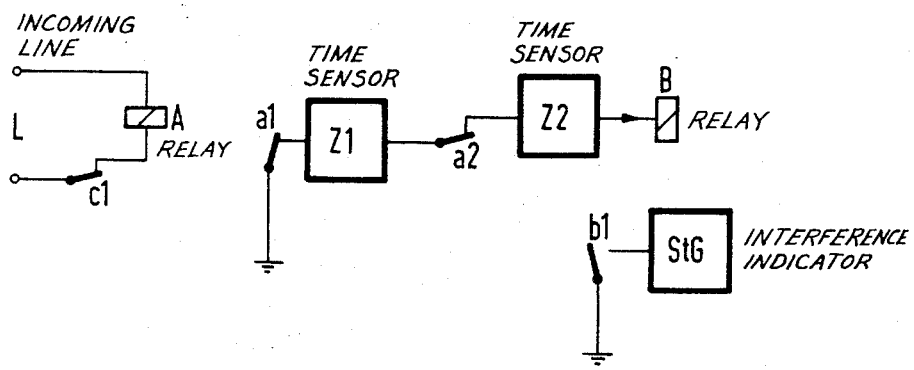
INVENTOR
Charles J. Colombo
BY
ATTYS.

United States Patent Office 3,429,998
Patented Feb. 25, 1969

3,429,998
METHOD AND ARRANGEMENT FOR CHECKING OF LINES IN TELEGRAPH INSTALLATIONS
Charles J. Colombo, Dorval, Montreal, Quebec, Canada, assignor to Siemens Aktiengesellschaft, a corporation of Germany
Filed Aug. 16, 1965, Ser. No. 479,950
Claims priority, application Germany, Aug. 18, 1964, S 92,697
U.S. Cl. 178—69       10 Claims
Int. Cl. H04l 25/02, 15/24, 15/34

ABSTRACT OF THE DISCLOSURE

A method and apparatus to check the transmission capacity of telegraph circuits to determine, by each received signal, whether the appertaining stop signal occurs at the prescribed time and with the correct polarity. If the appertained stop signal is absent, an interference indicator is rendered operative.

---

The invention relates to a method and an arrangement for telegraph receiving stations, particularly for printing-telegraph operations, for the checking of a transmission quality of the lines.

It is known practice in telegraphy engineering to check the transmission quality of lines by the connection of a start-stop distortion measuring device to the lines themselves and utilizing the measured distortion as the check basis. The start-stop distortion can there be measured both on the impulse combination representing the messages and also on impulses transmitted especially for the purpose.

This known method, while permitting a faultless and very accurate surveillance of the transmitting quality of lines, has, however, the disadvantage that a complicated measuring instrument must be available at each receiving station, namely a start-stop distortion measuring device, in order to be able to check the transmission quality.

The invention has as its problem that of creating a considerably simpler method and an arrangement for the checking of the transmitting quality of lines. For the solution of this problem the invention proceeds from the concept that through disturbed lines not only are the individual telegraph elements distorted, but generally a whole series of signals are uniformly deformed and distorted. Proceeding from this consideration, the transmitting quality of the lines can also be ascertained if only individual elements are measured in spot-check manner, and checked for their presence. According to the invention, this problem is solved by the method that the stop elements within a transmitted message are monitored for their completeness and on absence of the next stop element to be received within a certain time an interference indicator is rendered operative.

In this manner it is achievable according to the invention to determine the presence of a stop element belonging to each telegraph impulse combination and, if this is lacking, to render an interference indicator operative.

With especial advantage the invention can be so utilized that in the receiving station there are provided current polarity-evaluating circuit means, at least one time member measuring the time between each two stop elements and an interference indicator, whereby through the time member, on failure of the next stop element to be received within a certain receiving time, the interference indicator is rendered operative.

In this manner, with relatively simple circuit means, more specifically a polarized relay and a flip stage, it is possible for the transmission quality of the lines to be checked. The expenditure heretofore required for this function in the form of a reference distortion instrument is thereby considerably reduced.

Details of the invention will be apparent from the example of construction described with the aid of the drawing.

In the drawing there is represented at the left side an incoming line L to be monitored, in which line there is inserted a relay A which functions as circuit means for evaluating the current. With like advantage there can also be used, within the scope of the invention, a transistor circuit. In lines operated with bi-polar current pulses there can be used as current responsive circuit means either a polarized relay, a relay made sensitive to current direction through insertion of a rectifier, or also a transistor circuit. Moreover, there is additionally connected in the excitation current circuit of the relay a contact $c1$, indicating occupation which thus is closed when a seizure takes place.

In the middle of the drawing there are represented two time members $Z1$ and $Z2$, the time member $Z1$ being set for the time itnerval which lies between the initiation of a start element and the middle of the stop element to be received. In telegraphy according to International Telegraph Alphabet No. 2 with five elements, each of 20 ms. duration, a start element of 20 ms. duration and a stop element of 30 ms. duration, the time member $Z1$ accordingly would have to be set for a time interval of 135 ms. The time member $Z2$ is then set for the time within which the interference indication is to be carried out in each case by means of the interference indicator $StG$.

The detailed operation of the circuit is as follows: If the current polarity on the incoming line L changes from marking polarity, present in the rest state to spacing polarity indicating the operating state, the relay A is then so energized that it shifts its contacts $a1$, $a2$ into positions opposite to those shown in the drawing.

As soon as the first telegraph signal is received, through its starting element the relay A is caused to drop out and its contacts $a1$, $a2$ resume the position shown in the drawing. The time member $Z1$ is thereby rendered operative and begins to measure the required time interval. If, after the above stated time interval of 135 ms. the contact $a2$ is closed, the time member $Z2$ is then rendered operative, resulting in actuation of the relay B. The relay B closes its contact $b1$ and causes, through the interference indicator, the emission of interference indications over the outgoing line, not represented in this example.

If, however, the next stop element to be received has properly arrived, the relay A is thereby again excited on the spacing side and the contacts $a1$, $a2$ are opened, so that, if the time duration determined by the time member $Z1$, of, say 135 ms., causes the time member $Z1$ to become operative, the contact $a2$ is opened and the time member $Z2$ cannot go into operation.

Within the scope of the invention there can be utilized as time members $Z1$ and $Z2$, a monostable flip circuits, as well as delay relays. With especial advantage, the interference indication can, within the concept of the invention, be sent back to the transmitter by duplex operation.

If no special interference indicator text is desired, within the scope of the invention, the special interference indicator $StG$ may be omitted, it then being sufficient for the counter-transmission if a contact of relay B opens the line.

Changes may be made within the scope and spirit of the appended claims which define what is believed to be new and desired to have protected by Letters Patent.

I claim:
1. A method of checking the transmission qualities of a line at a telegraph receiving station, comprising the steps of checking the stop elements within a transmitted message for their completeness within a predetermined time period, and, upon failure to receive the next stop element within such time period, imparting an indication of such failure.

2. A method of checking the transmission qualities of a line at a telegraph receiving station, comprising the steps of initiating a timing measurement, responsive to a received start element, measuring a timing period having a duration equal to the normal duration of telegraph signal from the start element to the middle of the following stop element, and, in the event such following stop element is not received prior to the end of such timing period, imparting an indication of such failure.

3. An arrangement for a telegraph receiving station, for determining the transmission qualities of a line by checking the stop elements within a transmitted message for completeness, comprising a current-evaluating circuit means arranged for disposition in the line under test, at least one timing member operatively connected to said circuit means for measuring the duration between successive stop elements, and an interference indicator, operatively connected to said timing element, and, upon failure to receive the next stop element within a predetermined receiving time, operative to impart an indication of such failure.

4. An arrangement according to claim 3, wherein said current-evaluating circuit means comprises a polarized relay having contact means connected with said timing member, operative upon receipt of start-element polarity at said relay to initiate actuation of said timing member.

5. An arrangement according to claim 3, wherein said current evaluating circuit means comprises a transistor circuit.

6. An arrangement according to claim 3, wherein said current-evaluating circuit means comprises a relay and a rectifier connected in series therewith.

7. An arrangement according to claim 4, comprising in further combination, a second timing member operatively connecting said first timing member and said interference indicator, operative to control the operation of the latter in dependence upon the operational state of the first timing member and the current polarity at the current-evaluating circuit means.

8. An arrangement according to claim 4, wherein said timing member comprises a delay relay, particularly a drop-out delay relay.

9. An arrangement according to claim 4, wherein said timing member comprises a monostable flip-flop circuit.

10. An arrangement according to claim 3, wherein said interference indicator is operative to emit an interference indication in the form of a counter-transmission.

References Cited
UNITED STATES PATENTS

| | | |
|---|---|---|
| 2,275,940 | 3/1942 | Backus et al. |
| 2,307,842 | 1/1943 | Martin. |
| 2,340,065 | 1/1944 | Lang. |
| 3,331,922 | 7/1967 | Neiswinter et al. |

THOMAS A. ROBINSON, *Primary Examiner.*

U.S. Cl. X.R.

178—23